United States Patent [19]

Scott, deceased Winfield B. et al.

[11] Patent Number: 5,056,834
[45] Date of Patent: Oct. 15, 1991

[54] SYSTEM FOR JOINING CORRUGATED PIPE

[76] Inventors: Scott, deceased Winfield B., late of Granbury; Barbara A. Scott, executrix, 58 Rough Creek Estates, Granbury, both of Tex. 76048

[21] Appl. No.: 549,355

[22] Filed: Jul. 6, 1990

[51] Int. Cl.$^5$ .............................................. F16L 25/00
[52] U.S. Cl. .................................... 285/325; 285/330; 285/903; 29/513
[58] Field of Search ............... 285/325, 903, 424, 328, 285/330, 420, 403; 29/513, 890.144; 24/20 CW

[56] References Cited

U.S. PATENT DOCUMENTS

| 971,400 | 9/1910 | Orwig | 285/903 X |
| 1,020,002 | 3/1912 | Warner | 285/403 |
| 1,049,542 | 1/1913 | Smith | 285/903 X |
| 1,083,548 | 1/1914 | Martin | 285/903 X |
| 1,259,232 | 3/1918 | Hartman | 285/330 X |
| 4,222,594 | 9/1980 | Skinner | 285/903 X |

FOREIGN PATENT DOCUMENTS 0151046 9/1920 United Kingdom ............... 285/330

Primary Examiner—Dave W. Arola
Assistant Examiner—Heather Chun
Attorney, Agent, or Firm—Arthur F. Zobal; Geoffrey A. Mantooth

[57] ABSTRACT

A system for joining first and second lengths of corrugated pipe together uses at least two notches cut into a first end of the pipe length. Each notch is formed by two cuts extending longitudinally for at least one corrugation. The cuts are spaced apart so as to form a tab that can be bent outwardly to expose the notch. The first and second ends are fitted together so that the second end is received by the notches, wherein the second end partially encompasses the first end and the first end partially encompasses the second end. The corrugations at the first and second ends matingly fit together. The tabs are bent inwardly to retain the second end to the first end.

6 Claims, 3 Drawing Sheets

SYSTEM FOR JOINING CORRUGATED PIPE

FIELD OF THE INVENTION

The present invention relates to corrugated pipe in general, and to metal corrugated pipe in particular.

BACKGROUND OF THE INVENTION

Corrugated steel pipe is used to provide inexpensive, yet durable conduit for water and other fluids. The corrugations give the thin walled pipe added strength and enable it to be buried in the ground. A typical application of corrugated pipe is in forming a culvert, wherein a length of corrugated pipe is buried in the ground beneath a roadway, so as to provide a drain crossing beneath the roadway. Such an application typically requires 20-30 feet of corrugated pipe.

It is desirable to supply corrugated pipe in lengths are shorter than the typical 20-30 feet lengths that are dictated by culvert or other applications. This is because shorter pipe lengths are easier and safer to handle in transport. At the job site, the shorter pipe segments are joined together at their ends to make up the required length of pipe.

In the prior art, pipe lengths are joined together with metal connecting bands. To join two pipe lengths together, the pipe lengths are butted up against each other at their ends, and the band is assembled onto the two butted ends. The band encompasses the circumference of both pipes and overlaps the ends of both pipes. The band may be corrugated so as to matingly fit around the pipes, or it may be smooth and uncorrugated. The band is then tightened.

The problem with using bands in joining pipes together is the difficulty of installing them onto pipe. Smooth connecting bands are typically provided in straight lengths. The installer must locate the band around the ends of both pipe segments and then bend the stiff steel into a circular shape to conform to the shape of the pipe. The installer then must fasten the two ends of the band together. Smooth connecting bands have very little holding capability; the two pipes can easily pull apart even after the band has been tightened. Corrugated connecting bands have greater holding capability, but are also difficult to install. Corrugated connecting bands typically are provided already formed in a circular shape. Therefore, the band must be held open around one pipe end while the other pipe end is inserted into the band. This installation process requires two installers, one of which must struggle with holding open the stiff connecting band.

Another disadvantage is that connecting bands, which are extra pieces of equipment, add to the cost of using the pipe. Furthermore, connecting bands merely serve to hold the two ends of pipe together; the bands do not impart any structural strength to the pipe.

SUMMARY OF THE INVENTION

It is an object of the present invention to provide a system for joining together lengths of corrugated pipe, which system does away with the need for prior art connecting bands.

It is a further object of the present invention to provide a system for joining together lengths of corrugated pipe, which system is easy to implement.

The system of the present invention joins first and second lengths of corrugated pipe together. The first pipe length has a first end and the second pipe length has a second end. The system includes at least two notches that are formed in at least one of the first and second ends. The notches extend longitudinally from the respective end for at least one corrugation. The corrugations form peaks and valleys on the pipe lengths. One corrugation is the length between two adjacent peaks. The respective notches on the respective ends are adapted to receive the other of the first and second ends such that the ends are interlockingly engaged with each other, wherein when the first and second ends are interlockingly engaged the second end partially encompasses the first end and the first end partially encompasses the second end, and the corrugations at the first and second ends matingly fit each other. There is also retaining means for retaining the second end to the first end. The retaining means prevents movement of the second end transversely with respect to the first end.

In one aspect, the retaining means includes tabs that are formed in conjunction with the notches. Each of the tabs are formed by a set of longitudinal cuts in the respective end. The tabs are adapted to be bent transversely so as to form the notch. The tabs are corrugated.

In another aspect, the notches have an angular separation therebetween that is between some minimum angular separation and 180 degrees. The minimum angular separation is slightly less than 180 degrees and is that separation wherein the first and second ends can be interlocked together by flexing the walls of the pipe lengths.

The method for joining first and second lengths of corrugated pipes together includes the steps of providing the pipe lengths with at least two notches and at least one of the first and second ends. The notches have tabs that are associated therewith. Each of the tabs are formed by a set of longitudinal cuts in the respective end. The tabs are bent outwardly so as to expose the notches. The first and second pipe lengths are aligned longitudinally such that the first end is adjacent to the second end. The second end is raised slightly and moved to the first end such that the notches on the respective ends receive the other of the first and second ends and such that a portion of the second end is located outside of the first end and a portion of the second end is located inside of the first end. The second end is lowered so that the corrugations on the first and second ends matingly engage each other. The tabs are bent inwardly so as to contact the respective underlying end and to retain the ends together.

In one aspect, the tabs are formed by forming at least two sets of longitudinal cuts in the first end. Each set of cuts has two cuts so as to form the tab. The tabs extend for at least one corrugation.

DESCRIPTION OF PREFERRED EMBODIMENT

Figure 1:
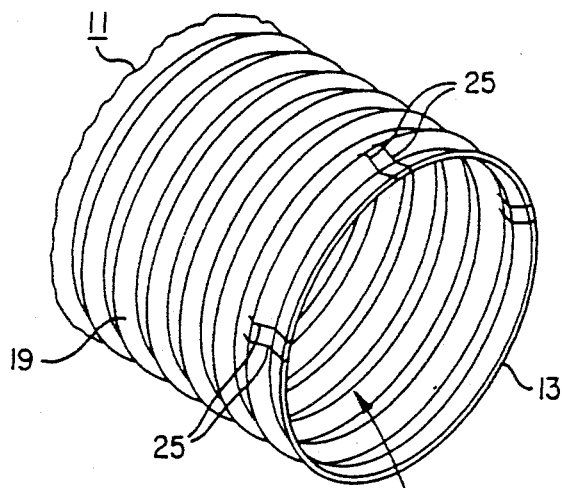
FIG. 1 is an isometric view of an end of corrugated pipe, incorporating the system of the present invention, in accordance with a preferred embodiment.
Figure 4:
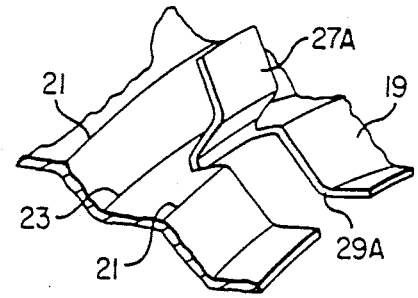
FIG. 4 is a close-up view of one of the bent up tabs.

In FIG. 1, there is shown an isometric view of an end of a length of corrugated pipe 11. The pipe 11 has first and second ends and a passage 17 therethrough for conducting fluids. The pipe wall 19 has annular corrugations which extend around the circumference of the pipe. As shown in FIG. 4, the corrugations have peaks 21 and valleys 23, with one corrugation being the distance between two adjacent peaks 21. Although not shown, the pipe may have spiral corrugations instead of annular corrugations. Spirally corrugated pipe typically has its ends formed with annular corrugations for ease in joining lengths of pipes together. The pipe wall 19 is made of galvanized steel, typically of 16 gauge thickness.

Figure 3:
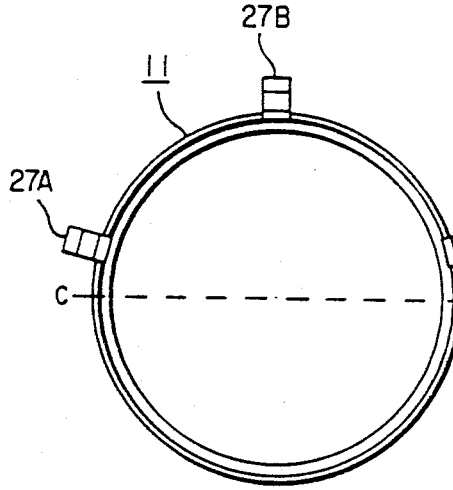
FIG. 3 is an end view of the pipe of FIG. 2.
Figure 2:
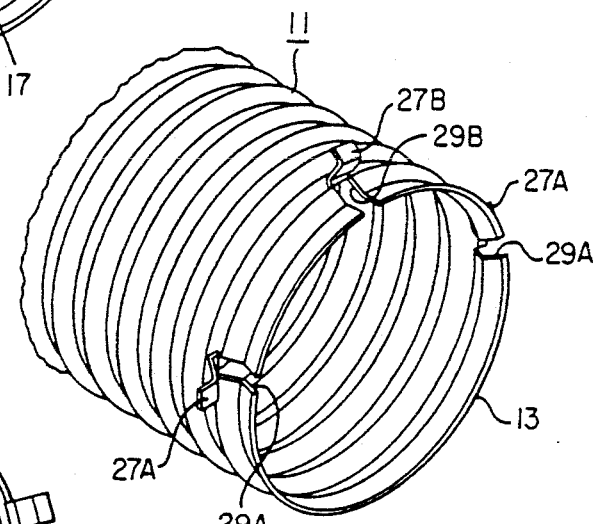
FIG. 2 is an isometric view of the pipe of FIG. 1, shown with the tabs bent outwardly.

The first end 13 of the pipe 11 has three sets of cuts 25 made in the pipe wall 19. Each set of cuts includes two cuts 25 that are parallel to each other and extend longitudinally from the first end 13. The cuts 25 are separated from each other by a short distance so as to form tabs 27A, 27B, as shown in FIGS. 2 and 3 (in FIGS. 2-4 the tabs are bent outwardly). In the preferred embodiment, there are two side tabs 27A and a top tab 27B. The top tab 27B is located between the side tabs 27A. Referring to FIG. 3, which shows an end view of the pipe 11, there is shown an imaginary line extending through the center of the pipe 11. The line intersects the pipe wall 19 at points C and D, which, because the line is a diameter, are 180 degrees apart. In the preferred embodiment, the side tabs 27A are located a short distance above the line CD. Thus, the side tabs are slightly less than 180 degrees apart. The cuts 25 extend at least one corrugation back from the end. The tabs are corrugated, having been formed from the corrugated wall 19 of the pipe. When the tabs 27A, 27B are bent outwardly, as shown in FIGS. 2-4, a respective notch 29A, 29B is formed where the tab was. The side notches 29A are for receiving the end of another length of pipe.

Referring to FIGS. 5-8, the procedure for joining first and second lengths 11A, 11B of pipe will now be described. The first and second pipe lengths are of equal diameter (within standard manufacturing tolerances), and both have annular corrugations. First, the cuts 25 and the corresponding tabs 27A, 27B are formed in the first end 13 of the first length 11A of pipe. This may be done either at the manufacturing plant or in the field just before installation of the pipe in the ground. A cutting tool such as a hand held band saw or a hacksaw may be used to form the cuts 25. The second end 15 of the second length 11B of pipe is unmodified.

Figure 9:
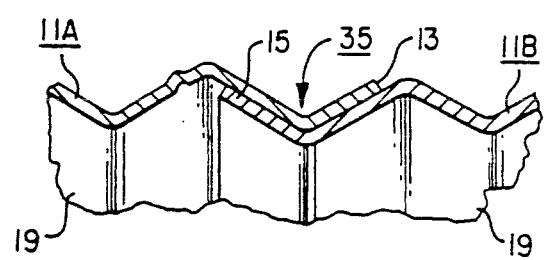
FIG. 9 is a longitudinal cross-sectional view of a completed pipe joint.
Figure 5:
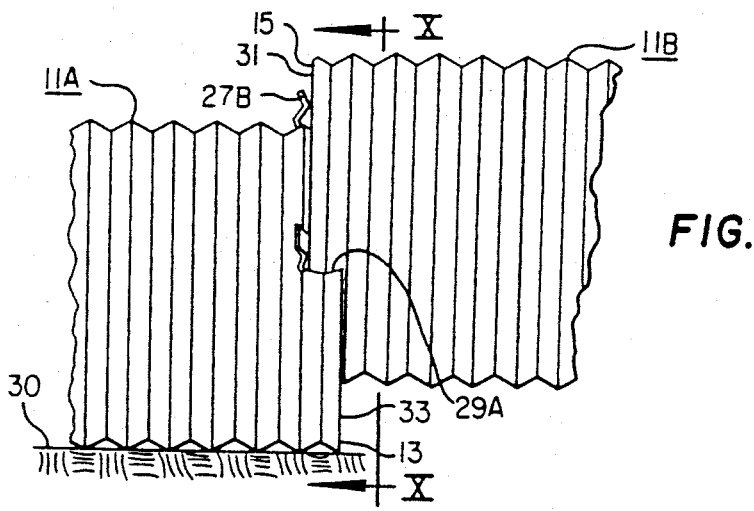
FIGS. 5-8 are side views of the ends of two pipes, showing the steps in joining the pipes together.
Figure 6:
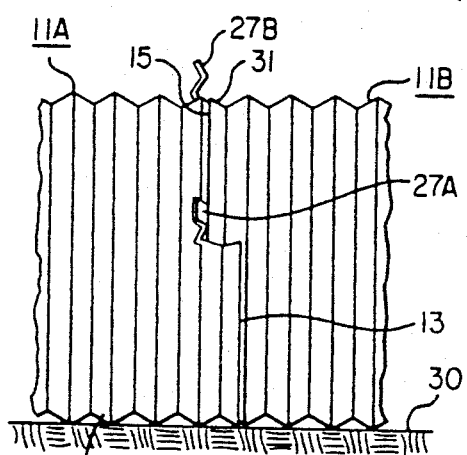

The first and second lengths 11A, 11B of pipe are laid in a trench or wherever they are to be located on the ground 30. The first end 13 of the first pipe length 11A is laid adjacent to the second end 15 of the second pipe length 11B. The first length 11A of pipe is turned until the top tab 27B is on top. The tabs 27A, 27B are bent outwardly using a pair of pliers, or some other tool. Then, as shown in FIG. 5, the second end 15 of the second pipe length 11B is picked up and moved into the first end 13 of the first pipe length 11A such that the side notches 29A receive the second end 15. In this position, the second end 15 of the second pipe length is several inches higher than the first end of the first pipe length, wherein the upper portion 31 of the second end 15 is located outside of the first pipe length 11A and the lower portion of the second end is located inside of the first pipe length. The second end 15 of the second pipe length is lowered to a position shown in FIG. 6. In this lower position, the corrugations of the first and second pipe lengths matingly fit together. (FIG. 9 illustrates a mating fit of two corrugated walls 19.) Referring to FIG. 6, the upper portion 31 of the second end 15 is located outside of the upper portion of the first end 13, while the lower portion of the second end 15 is located inside of the lower portion 33 of the first end 13. The second end 15 changes from being on the outside of the first end 13 to being on the inside of the first end at the side notches 29A. Thus, the side notches 29A allow the first and second ends to interlockingly engage each other.

Figure 7:
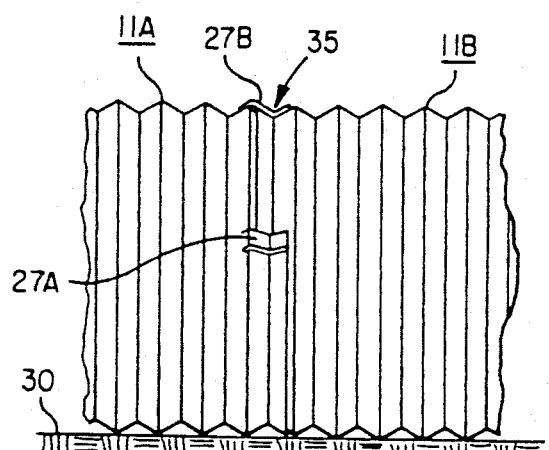
Figure 8:
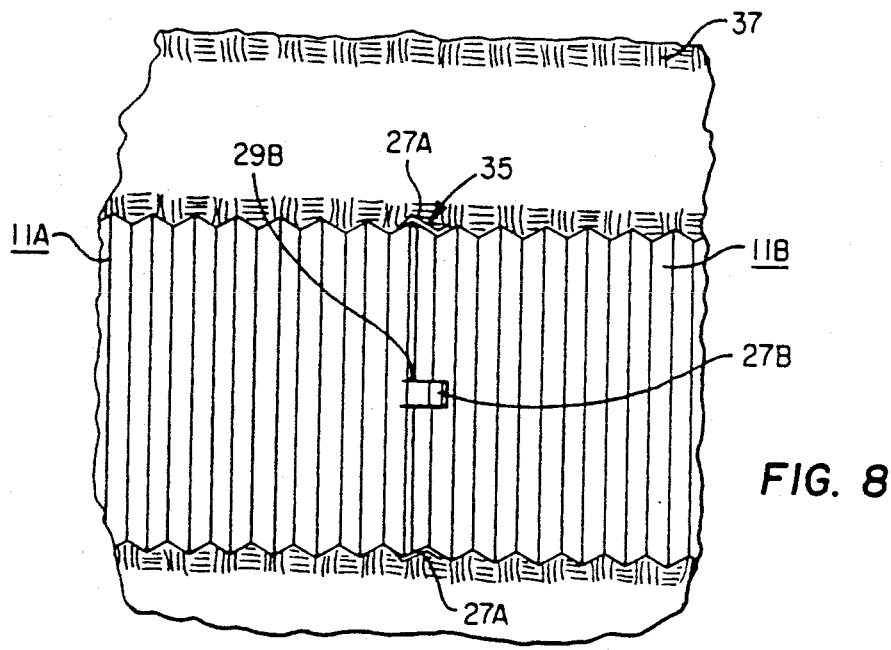

The tabs 27A, 27B are then bent inwardly toward their original position, wherein the tabs, which are corrugated, matingly fit the corrugations of the second end 15 (see FIG. 7). The tabs, which are formed from the pipe wall, are stiff and retain their position, thereby retaining the second end to the first end. The first and second pipe lengths are thus joined together. The tabs, which are located on the first pipe length 11A, retain the second pipe length 11B in its position. In the preferred embodiment, the top tab 27B is used for retaining purposes only; the second end 15 does not enter the notch 29B. (See FIG. 8 where the top tab 27B has been rotated to the side.)

The joint 35 formed by the first and second ends 13, 15 prohibits axial movement and shearing movement of the pipe lengths 11A, 11B relative to each other, thereby fixedly maintaining the pipe lengths together. Axial movement is prohibited by the corrugations at the first and second ends 13, 15. In order to unlock the corrugations, one of the pipe ends must move transversely before moving axially. But, any transverse movement is prohibited by the interlocked corrugated pipe walls 19 and by the tabs 27A, 27B. The interlocked corrugated pipe walls 19 prevent the second end 15 from moving down or sideways with respect to the first end 13, while the tabs 27A, 27B prevent the second end from moving up.

Because the pipe 11A, 11B is used in low pressure applications, such as culvert or drain applications, the joint 35 need not be waterproof. To add additional pipe to the first and second pipe lengths 11A, 11B, the first end of the second pipe (not shown) is worked to form tabs and notches, wherein the second pipe first end can join to a second end of a third pipe, and so on. In this manner, plural lengths of pipe can be joined together to make the desired conduit length.

The joint 35 is inherently strong because the ends of the pipe lengths are reinforced by a double pipe wall thickness, as shown in FIG. 9. In practice, it has been found that the strength of the joint is increased if the pipe lengths are rotated so that the top tab 27B is moved to one side, wherein the side tabs 27A are located on the top and bottom of the pipe (see FIG. 8). After the pipe is positioned as desired, the pipe is covered with earth 37.

In the preferred embodiment, for a 12 inch diameter pipe, the tabs 27A, 27B and thus the respective notches 29A, 29B are between $\frac{3}{4}$-2 inches wide and extend back from the pipe end at least one corrugation. Most corrugated pipes are made with the corrugations spaced $2\frac{2}{3}$ inches apart peak to peak, although some corrugated pipes are made with three inch spacing between corrugations. The tabs and notches then, are at least 2⅜ inches long. For larger diameter pipes, the length of the tabs and notches may be increased to two or three corrugations, and the width of the tabs and notches may also be increased accordingly.

Figure 10:
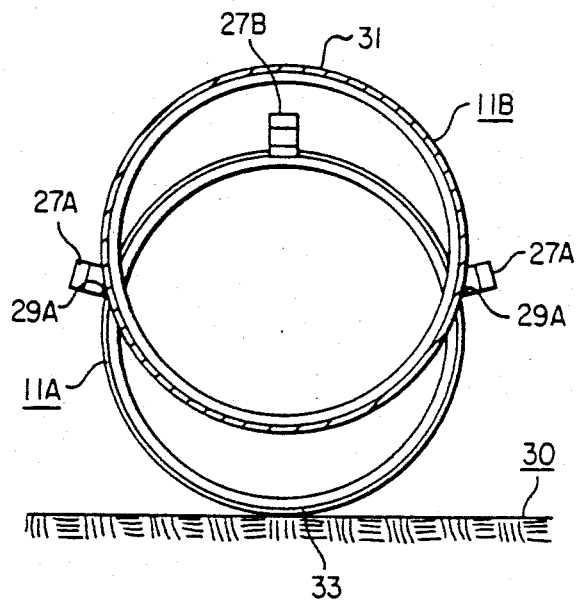
FIG. 10 is a transverse cross-sectional view taken through lines X—X of FIG. 5.

As described above, the side tabs 27A and notches 29A are located slightly less than 180 degrees apart. The notches 29A could be located 180 degrees apart, wherein the second end 15 will be received by the notches and easily dropped down into a mating fit with the first end 13 as shown in FIG. 6. With the notches 29A located slightly less than 180 degrees apart, as shown in FIGS. 3 and 10, the second end 15 must be forced down through the side notches. This is because the distance between the side notches 29A is less than the diameter of the second end, as shown in FIG. 10. The larger diameter of the second end must therefore be forced through the narrower distance between the side notches 29A, causing the walls of the first and second ends to flex to accommodate the larger diameter. Once the second end 15 has been forced down into mating engagement with the first end 13, the walls of the first and second ends flex back to their original circular position. The position of the side notches 29A serves to retain the first end from moving up with respect to the second end. With this type of arrangement, the tabs 27 need not be used to retain the second end relative to the first end.

As the angle between the notches 29A gets smaller, it becomes more and more difficult to engage the second end with the first end. This is because the distance between the notches 29A becomes too small to force the larger diameter of the second end down. There is some minimum angular separation between the side notches for each pipe, with which the ends can be interlocked together via the notches. Angular separations that are smaller than the minimum angular separation require excessive pipe wall deformation in order to interlockingly engage the two ends. I have found that for pipes ranging 12 to 24 inches in diameter, positioning the side notches 29A about 1 to 2 inches above line CD works very well. The second end can be forced down into mating engagement with the first end and the notches retain the second end in place. For pipes ranging 24-48 inches in diameter, the notches are positioned about 1 to 3 inches above line CD.

Figure 11:
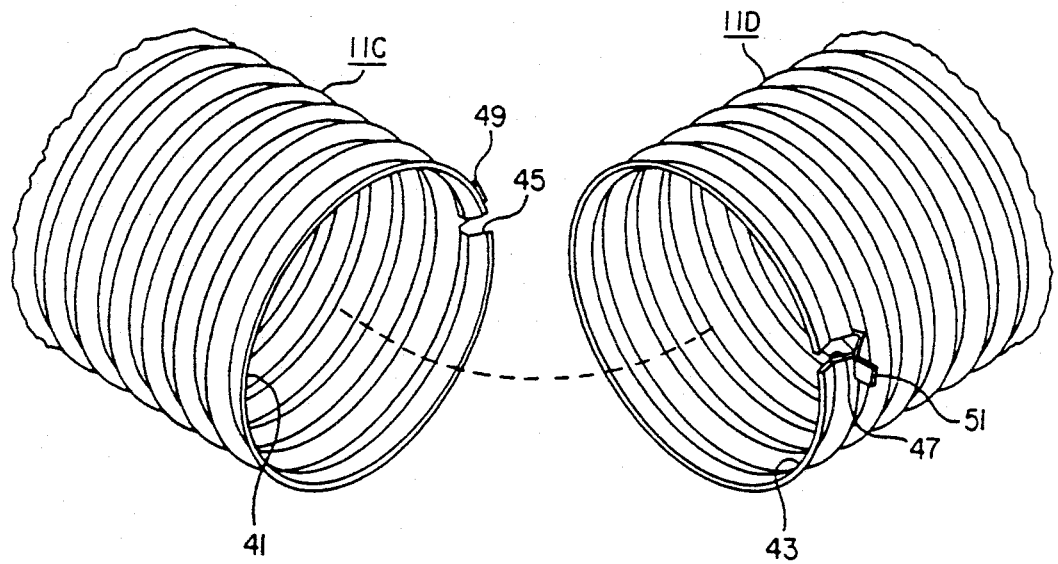
FIG. 11 is an isometric view of the ends of two pipe lengths, showing the system of the present invention, in accordance with another embodiment.

Another embodiment is illustrated in FIG. 11. Each pipe length 11C, 11D has first and second ends 41, 43. Each end has a single notch 45, 47 and corresponding tab 49, 51 formed therein. To join the pipe lengths together, the pipe lengths are first aligned longitudinally with respect to each other. One pipe length is rotated so that the notches (with the tabs bent outwardly) are generally diametrically opposed, so as to be either 180 degrees apart or slightly less than 180 degrees apart, as described above. The second end 43 is picked up and moved into the first end 41 such that the first end notch 45 receives the second end 43 and the second end notch 47 receives the first end 41. The second end 43 is then lowered so that the corrugations of the first and second ends matingly fit together, wherein the upper portion of the second end is located outside the upper portion of the first end and the lower portion of the second end is located inside of the lower portion of the first end. The pipe length 11D and its second end may then be rotated with respect to the pipe length 11C and its first end, to move the notches 45, 47 closer together. The tabs 49, 51 are then bent inwardly to matingly fit the corrugations of the second end.

The embodiment of FIGS. 1-10 has been successfully implemented and tested to provide a system and method for joining together corrugated pipe. It is believed that the embodiment of FIG. 11 will also provide a system and method for joining together corrugated pipe.

The system for joining corrugated pipe is easy to implement. The tabs may be formed at the manufacturing plant. Installation in the field requires only bending the tabs out, fitting the pipe lengths together, and bending the tabs back in. No additional parts, such as connecting bands are required, thereby reducing inventory requirements. Joining pipes with prior art connecting bands requires having on hand several sizes of connecting bands in order to fit around the wide variety of pipe diameters. The need for such bands is eliminated with the system of the present invention.

Furthermore, the system of the present invention reduces corrugated pipe inventories. Because joining pipe lengths together is simple and inexpensive, only a few pipe lengths need to be stocked. The short pipe lengths can then be joined together at the job site to make up the required length. Having smaller pipe lengths both simplifies shipping and handling and increases safety in handling the pipe.

The foregoing disclosure and the showings made in the drawings are merely illustrative of the principles of this invention and are not to be interpreted in a limiting sense.

What is claimed is:

1. A system for joining first and second lengths of corrugated pipe together, said first pipe length having a first end and said second pipe length having a second end, said first and second pipe lengths having respective longitudinal axes, comprising:
   a) at least two notches formed in at least one of said first and second ends, said notches extending longitudinally from said respective end for at least one corrugation, said corrugations forming peaks and valleys on said pipe lengths, said one corrugation being the length between two adjacent peaks;
   b) said respective notches on said respective ends being adapted to receive the other of said first and second such that said ends are interlockingly engaged with each other, wherein when said first and second ends are interlockingly engaged said second end partially encompasses said first end and said first end partially encompasses said second end, and the corrugations at said first and second ends matingly fit each other;
   c) retaining means for retaining said second end to said first end, said retaining means preventing movement of said second end transversely with respect to said first end, said retaining means comprising tabs formed in conjunction with said notches, each of said tabs being formed by a set of longitudinal cuts in said respective end, said tabs being adapted to be bent transversely so as to form said notch, said tabs being corrugated.

2. A system for joining first and second lengths of corrugated pipe together, said first and second pipe lengths having equal diameters, said first pipe length having a first end and said second pipe length having a second end, said first and second pipe lengths having respective longitudinal axes and respective corrugated walls, comprising:

a) two notches formed in said first end, said notches extending longitudinally from said first end;
b) said first end notches being adapted to receive the second end of said second pipe length interlockingly engaged with each other, wherein when said first and second ends are interlockingly engaged said second end partially encompasses said first end and said first end partially encompasses said second end, and the corrugations at said first and second ends matingly fit each other;
c) retaining means for retaining said second end to said first end, said retaining means preventing movement of said second end transversely with respect to said first end;
d) said retaining means comprising tabs formed in conjunction with said notches, each of said tabs being formed by a set of longitudinal cuts in said respective end, said tabs being adapted to be bent transversely so as to form said notch, said tabs being corrugated.

3. The system of claim 2 wherein said tabs are first and second tabs, further comprising a third tab located between said first and second tabs, said third tab being adapted to retain said second end to said first end.

4. A system for joining first and second lengths of corrugated pipe together, said first and second pipe lengths having equal diameters, said first pipe length having a first end and said second pipe length having a second end, said second end having a diameter, said first and second pipe lengths having respective longitudinal axes and respective corrugated walls, comprising:
a) two notches in said first end, said notches extending longitudinally from said first end;
b) said first end notches being adapted to receive the second end of said second pipe length such that said first and second end are interlockingly engaged with each other, wherein when said first and second ends are interlockingly engaged said second end partially encompasses said first end and said first end partially encompasses said second end, and the corrugations at said first and second ends matingly fit each other;
c) retaining means for retaining said second end to said first end, said retaining means preventing movement of said second end transversely with respect to said first end;
d) said retaining means comprising said notches extending for at least one corrugation, said corrugations forming peaks and valleys on said pipe lengths, said one corrugation being the distance between two adjacent peaks, said notches being located less than 180 degrees apart such that said notches in their entirety are separated by a distance which is less than the diameter of said second end, wherein said pipe walls must be flexed to disengage said first and second ends.

5. A method for joining first and second lengths of corrugated pipe together, said first pipe length having a first end and said second pipe length having a second end, said first and second pipe lengths having respective longitudinal axes, comprising the steps of:
a) providing said pipe lengths with at least two notches in at least one of said first and second ends, said notches having tabs associated therewith, each of said tabs being formed by a set of longitudinal cuts in said respective end;
b) bending said tabs outwardly so as to expose said notches;
c) aligning said first and second pipe lengths longitudinally such that said first end is adjacent to said second end;
d) raising said second end slightly and moving said second end to said first end such that said notches on said respective ends receive the other of said first and second ends and such that a portion of said second end is located outside of said first end and a portion of said second end is located inside of said first end;
e) lowering said second end so that the corrugations on said first and second ends matingly engage each other;
f) bending said tabs inwardly to contact said respective underlying end, so as to retain said ends together.

6. A method for joining first and second lengths of corrugated pipe together, said first pipe length having a first end and said second pipe length having a second end, said first and second pipe lengths having respective longitudinal axes and respective corrugated walls, comprising the steps of:
a) forming at least two sets of longitudinal cuts in said first end, each set of cuts having two cuts so as to form a tab, said tabs extending for at least one corrugation, said two tabs being separated from each other by an angular separation;
b) bending said tabs outwardly so as to expose notches formed by said cuts;
c) aligning said first and second pipe lengths longitudinally such that said first end is adjacent to said second end;
d) raising said second end slightly and moving said second end to said first end such that said notches on said first end receive said second end and such that a portion of said second end is located outside of said first end and a portion of said second end is located inside of said first end;
e) lowering said second end so that the corrugations on said first and second ends matingly engage each other;
f) bending said tabs inwardly to contact said respective underlying end, so as to retain said ends together.

* * * * *